United States Patent [19]

Funk

[11] Patent Number: 5,161,008
[45] Date of Patent: Nov. 3, 1992

[54] OPTOELECTRONIC IMAGE SENSOR FOR COLOR CAMERAS

[75] Inventor: Hans W. Funk, Hirschberg, Fed. Rep. of Germany

[73] Assignee: Proxitronic Funk GmbH & Co. KG, Bensheim, Fed. Rep. of Germany

[21] Appl. No.: 608,514

[22] Filed: Nov. 2, 1990

[30] Foreign Application Priority Data

Nov. 6, 1989 [DE] Fed. Rep. of Germany ....... 3936930

[51] Int. Cl.$^5$ .............................................. H04N 9/07
[52] U.S. Cl. .................................... 358/44; 358/211; 358/217; 358/209
[58] Field of Search ................... 358/211, 217, 44, 42, 358/43, 213.13, 228, 213.19; 250/213 VT, 226

[56] References Cited

U.S. PATENT DOCUMENTS

| | | | |
|---|---|---|---|
| 4,151,553 | 4/1979 | Sugihara | 355/44 |
| 4,974,089 | 11/1990 | Gilligan | 358/211 |
| 4,974,090 | 11/1990 | Kawamura | 358/217 |
| 4,980,772 | 12/1990 | Kawamura et al. | 358/217 |

FOREIGN PATENT DOCUMENTS 3618646 10/1987 Fed. Rep. of Germany .
1147986 9/1989 Japan .

Primary Examiner—Michael Razavi
Assistant Examiner—Tuan V. Ho
Attorney, Agent, or Firm—Sprung Horn Kramer & Woods

[57] ABSTRACT

An optoelectronic image sensor for a color camera comprises an image intensifier which is configured as a proximity-focussed image intensifier diode and contains a photocathode, an interline type semiconductor sensor coupled to the image intensifier where light-sensitive elements are arranged in lines and columns. Between light-sensitive elements of adjacent columns, there are light-insensitive areas. It further comprises a color stripe filter which is disposed in front of the photocathode such that one color stripe of the color stripe filter is associated with one column of light-sensitive elements of the semiconductor sensor.

6 Claims, 2 Drawing Sheets

OPTOELECTRONIC IMAGE SENSOR FOR COLOR CAMERAS

BACKGROUND OF THE INVENTION

The invention relates to an optoelectronic image sensor for a color camera where the proximity-focussed image intensifier is coupled to a two-dimensional semiconductor sensor.

In order to increase the light-sensitivity of a color camera by means of a semiconductor sensor, it is known to interpose a proximity-focussed image intensifier upstream of the semiconductor sensor with the color coding filter disposed directly in front of the flat photocathode of the proximity-focussed image intensifier (German Patent No. 36 18 646 A1). In case of a two-dimensional semiconductor sensor, the color coding filter is a mosaic filter. As compared to other known arrangements (German Patent No. 36 18 647 A1), this arrangement advantageously makes use of only one semiconductor sensor.

Due to the small dimensions of the light-sensitive surfaces of the semiconductor, each of which is associated with one pixel, and due to the correspondingly small individual surfaces of the mosaic filter, an exact registration of this mosaic filter with the semiconductor sensor is extremely difficult. An exact registration is required, however, to obtain a correct color reproduction.

Further, the British Patent No. 2,107,150 discloses an optoelectronic image sensor where the color stripe filter is mounted to the outside of a fiber glass input window of a microchannel image intensifier. In this known image sensor, the light, which is hence filtered according to separate colors, is first fed through the fiber optic pane to the photocathode. The problem here is that, on the one side, the individual glass fibers do not have the desired small thickness and, on the other hand, they are not exactly parallel to one another. This unparallelism of the glass fibers can cause distortions of 50 to 100 $\mu$m. The geometrical reproduction of the color stripes on the photocathode is hence not sufficiently accurate. In addition, there are errors caused by the microchannel image intensifier itself due to the large range of the electrons emanating from the microchannel plate and errors caused by the optical transmission of the image from the viewing screen to the semiconductor sensor. These latter errors are caused by flaws in the fiber optic pane between the viewing screen and the semiconductor similar to the already described errors between the color stripe filter and the photocathode, and, further, caused by the lack of fiber-fiber coincidence when two fiber optic panes are coupled.

The described image reproduction errors cause the light, which is intensified and filtered by a color stripe, to arrive not only at the corresponding column of the semiconductor sensor but also at adjacent columns. The purposes of the latter, however, is the optoelectronic sensing of other color components. The result is a false color response.

SUMMARY OF THE INVENTION

It is hence an object of the present invention to provide an optoelectronic image sensor with a semiconductor sensor for a color camera which allows a more exact registration and reduced color cross-talk than has been possible heretofore. It is a further object of the present invention to provide an optoelectronic image sensor of the aforementioned type whose manufacture involves only a minor amount of technical effort.

These objects, as well as other objects which will become apparent from the following description, are achieved, in accordance with the present invention, by providing an optoelectronic image sensor comprising:

(a) an image intensifier which is configured as a proximity-focussed image intensifier diode and contains a photocathode;

(b) an interline type semiconductor sensor coupled to the image intensifier where the light-sensitive elements are arranged in lines and columns and where light-insensitive areas are located between the light-sensitive elements of adjacent columns; and (c) a color stripe filter which is disposed in front of the photocathode such that one color stripe of the color stripe filter is associated with one column of light-sensitive elements of the semiconductor sensor.

In addition to a reduced color cross-talk at a high light sensitivity, the optoelectronic image sensor in accordance with the invention also has the advantage that a sudden, short supply of operating voltage of the proximity-focussed image intensifier permits the color reception of rapidly moving objects.

Using a commercially available, inexpensive semiconductor and a distortion-free, high-resolution image intensifier, the optoelectronic image sensor allows color camera recordings at a low illumination. According to conventional standards, the resolution of luminance and chrominance is improved over presently broadcast television images. Here, 756 pixels per line approximately correspond to a band width of 7 MHz.

Particularly advantageous with respect to color cross talk, a further improvement of the invention determines that a clear glass pane is used as an input window of the image intensifier. On the inside of the image intensifier, this clear glass pane supports the stripe filter on which the photocathode is mounted.

Another improvement consists in that the color stripe filter is mounted to a glass pane having a diameter smaller than the proximity-focussed image intensifier. This permits a precise and inexpensive manufacture of the color stripe filter by using known processes and devices.

In an advantageous embodiment of this improvement provision is made for the glass pane to be inserted in a non-conductive support ring preferably also made of glass in such a way that the surfaces of both the glass pane and the support ring, which point to the interior of the proximity-focussed image intensifier, are located essentially on one plane. Unsteady flux lines in the interior of the proximity-focussed image intensifier, which otherwise could cause field emission, are thus avoided.

According to another advantageous embodiment, an exact matching is possible in that the support ring is provided with an opening conically converging toward the inside and in that the glass pane is provided with a corresponding conical edge.

If, in individual cases, the distance between the individual pixels of the semiconductor fails to provide a sufficient color separation, another improvement proposes to provide light-impermeable stripes between the color stripes. These are preferably manufactured by means of chromium vapor deposition.

Yet another improvement of the invention proposes to attach the color stripe filter to a glass pane which in turn is disposed at the outside of a fiber optic pane supporting the photocathode. This allows mounting and positioning the color stripe filter after the assembly of the image intensifier and the semiconductor.

Higher acceleration voltages which are necessary for greater intensification require a larger distance between photocathode and viewing screen. This, however, decreases the resolution since the range of the electrons perpendicular to the optical axis increases. This in turn may cause electrons, which emanate from places on the photocathode that are associated with one color, to arrive at adjacent pixels. In order to oppose this effect, another embodiment of the invention determines that on its inner side supporting the photocathode and in the respective area of the core glass, the fiber optic pane be provided with indentations with respect to the enveloping glass.

The preferred embodiments of the present invention will now be described with reference to the accompanying drawings.

DESCRIPTION OF THE PREFERRED EMBODIMENTS

Figure 1:
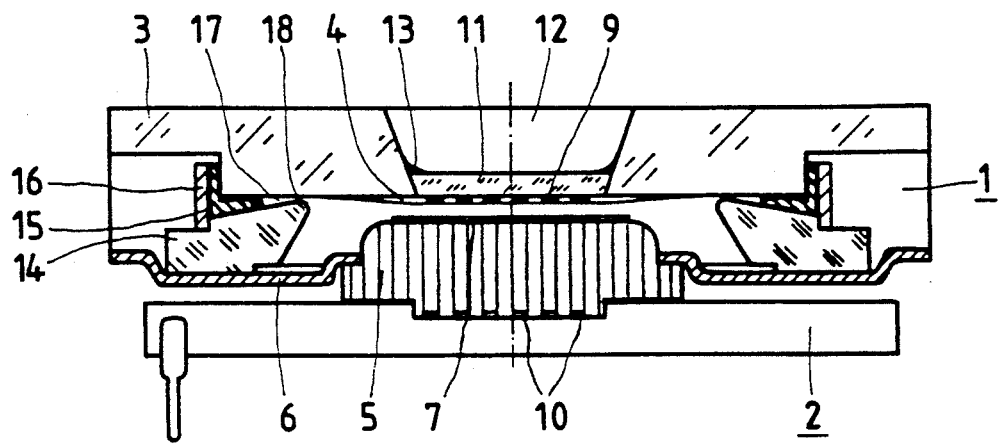
FIG. 1 is a longitudinal cross section of a first embodiment of an optoelectronic image sensor according to the present invention.

In the Figures, identical elements are designated with the same reference numerals.

The image sensor of FIG. 1 comprises a proximity-focussed image intensifier 1 and an interline type CCD sensor 2. Proximity-focussed image intensifiers are described at great length in the literature, e.g. in "Feinwerktechnik und MeBtechnik", Volume 90, 1982, Issue 2, pages 59 to 61, K. Frank: "Nahfokus-Bildwandler und -Bildverstärker" [Proximity-Focussed Image Converters and Image Intensifiers]. Therefore, this specification includes only brief descriptions of those parts of the proximity-focussed image intensifier 1 which are required for the understanding of the invention.

The proximity-focussed image intensifier 1 comprises an evacuable vessel with an input window 3 which carries the photocathode 4 and, as is well known in proximity-focussed image intensifiers, is configured as a pane. The output window includes an optical glass fiber body 5 and metal flange 6 soldered thereto. At its inside, the optical glass fiber body 5 supports a luminescent screen 7, and it is coupled at the outside to an interline type CCD sensor 2. Due to the small distance between the photocathode 4 and the luminescent screen 7, these proximity-focussed image intensifiers have a great resolution without requiring further optoelectronic auxiliary means for focussing.

In the optoelectronic image sensor in accordance with the invention, the incident light traverses a color stripe filter 9 before it arrives at the photocathode 4. As will be explained later with reference to FIG. 2, the color stripes and the individual light-sensitive elements 10 of the interline type CCD sensor, hereafter referred to as pixels, are coordinated in such a way that one color stripe is reproduced on one column of pixels of the interline type CCD sensor 2.

In order to achieve maximum resolution, CCD sensors are provided with a highest possible number of pixels. The number of color stripes must hence be selected correspondingly high. Moreover, since great accuracy of the color stripes is required for a satisfactory registration of the pixels and the color stripes over the entire frame, methods similar to the manufacture of CCD sensors are used to produce the color stripes. The so called step-and-repeat-method permits a particularly accurate and yet inexpensive manufacture of color stripe filters. Here, several color stripe filters are produced simultaneously. Their size, however, is limited to the dimensions required for the light-sensitive surface of the CCD sensor.

In the embodiment of FIG. 1, the color stripe filter 9 is attached to a round glass pane 11 the diameter of which is substantially smaller than the diameter of the proximity-focussed image intensifier 1. The glass pane 11 is then inserted in the input window 3 which serves as a support ring in such a way that the surfaces of the support ring 3 and the glass pane 11, both pointing toward the inside, form one plane. Unsteady flux line curves in the transitional area between the glass pane 11 and the support ring 3 are thus avoided.

The conical shape of the opening 12 for the glass pane 11 and the edge of the latter provide a particularly favorable support for this glass pane 11. A particularly good dimensional accuracy can be obtained by grinding the edges. A glass solder 13 serves to further seal the unit.

Further, the support ring 3 and the metal flange 6 are joined by a spacer 14 which is also made of glass. This spacer 14 and the metal flange 6 are joined by means of a known solder which is suitable to connect glass to metal. An indium ring 15 joins the spacer 14 and the support ring 16 firmly and gastight in a known way. On its outside, this indium ring is enclosed by a steel ring 16. The front surface 17 of the spacer 14 is inclined in such a way that there is sufficient space left at its outside for the indium ring 15 and that the inner edge 18 of the front surface 17 is at the smallest possible distance to the inner surface of the support ring 3.

Figure 2:
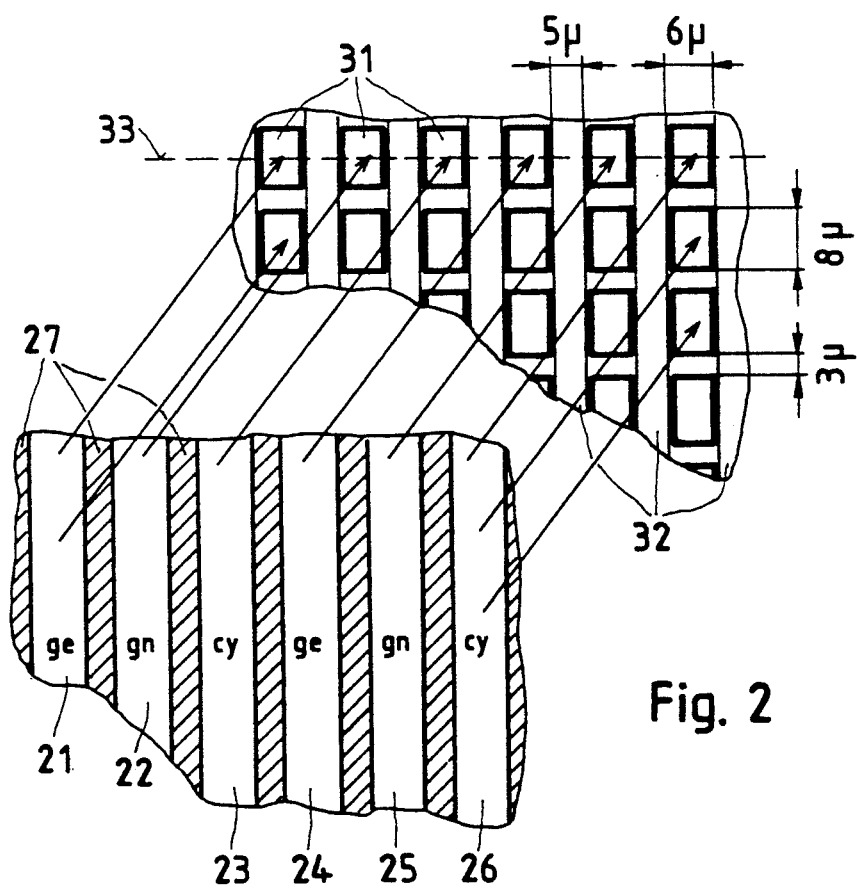
FIG. 2 is a detail of a color stripe filter including the corresponding part of the two-dimensional semiconductor sensor.

FIG. 2 is a detail of the color stripe filter 9 (FIG. 1) with six stripes 21 to 26 as well as a detail of the CCD sensor including pixels 31 in comparison to the represented detail. The stripes, which are repeated in sequences, are permeable in the spectral ranges yellow, green and cyan. Analogously, it is also possible to use stripes with the spectral ranges red-green-blue. The arrows indicate how the stripes 21 to 26 are associated with the pixels 31. The pixels that are horizontally juxtaposed in FIG. 2 are provided for one television line 33 each.

In known interline type CCD sensors, the dimensions of the pixels are smaller than the corresponding raster dimensions. In particular, there is a light-insensitive region between every two pixels adjacent in line direction since there are charge storage elements 32 which provide the intermediate storage of the electrical charges. FIG. 2 gives typical dimensions for an interline type CCD sensor. Due the light-insensitive regions, it is possible to obtain a reproduction of the color stripes on the pixels without significant cross talk between the colors despite unavoidable tolerances, electron straying and reproduction errors on the glass fiber panes. Depending on individual cases, it is possible to provide one light-impermeable stripe 27 between each of the color stripes 21 to 26 in order to avoid cross talk. This stripe 27 can be advantageously manufactured by means of chromium vapor deposition.

In the embodiment of FIG. 1, the color stripe filter is inside the image intensifier. The exact position of the color stripe filter is hence determined when the image intensifier is completely mounted. Since the color stripes must correlate with the pixels in a most accurate way, an adjustment can be achieved by moving the semiconductor sensor 2 on the glass fiber body 5 until a test pattern is accurately reproduced. Then the semiconductor sensor 2 is fixed using a suitable glue.

The glass fiber body 5 has a boss which enters into a recess of the semiconductor sensor 2. Both are rectangular shaped. The dimensions of the boss are a little bit smaller than those of the recess to enable the adjustment. In order to get an exact alignment of the edges of the boss in respect to the direction of the color filter stripes, the edges of the boss are ground after the image intensifier tube is completed.

Figure 3:
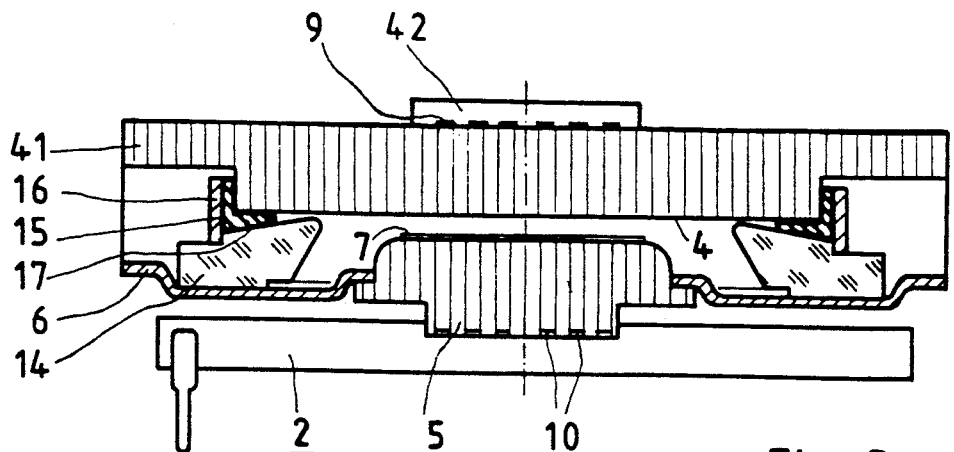
FIG. 3 is a longitudinal cross section of a second embodiment of an optoelectronic image sensor according to the present invention.

The embodiment of FIG. 3 comprises a glass fiber input window 41 on the outside of which the color stripe filter is attached which in turn is supported by a glass pane 42. On the inside of the glass fiber pane 41, there is the photocathode 4. The glass fiber body 5, which carries the viewing screen 7, is formed such that it extends into a corresponding recess of the semiconductor sensor 2.

Figure 4:
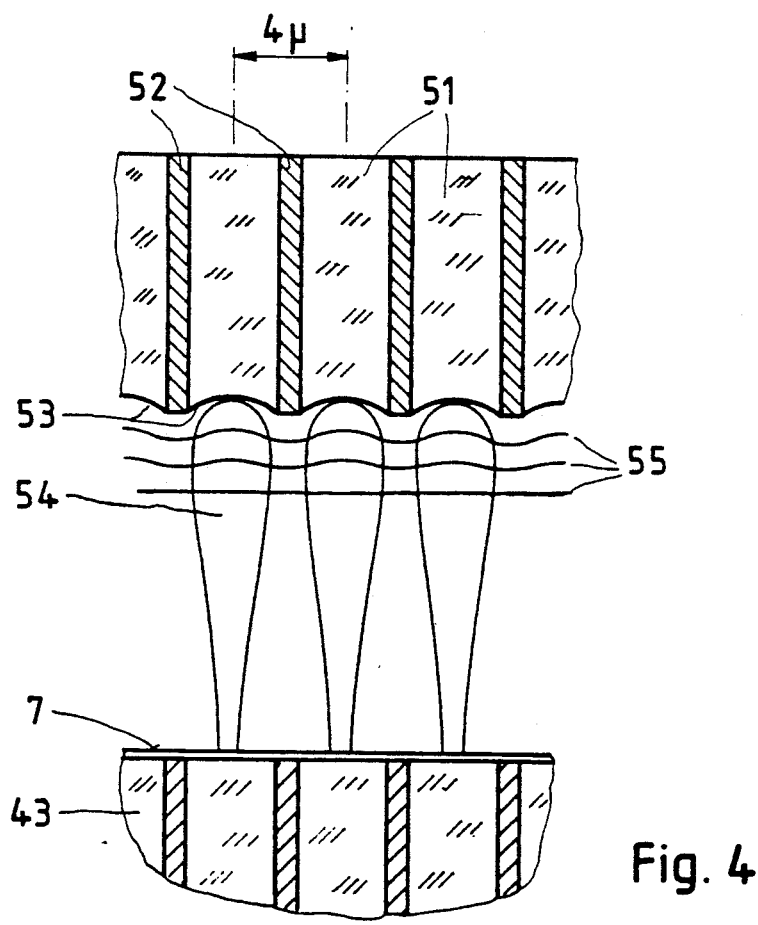
FIG. 4 is a segment of an image intensifier with measures to improve the resolution.

FIG. 4 shows a portion of an image intensifier where both the input window and the output window are made of glass fiber panes. An image intensifier of this kind is used in the embodiment of FIG. 3, for example. In order to reduce the lateral electron straying and, hence, avoid so-called "color cross talk", provision is made for recesses in the core glass 51 of the input window with respect to the enveloping glass 52. For this purpose, there are known methods where etching agents are used which act upon the core glass but do not affect the enveloping glass 52. This results in the generation of equipotential lines 55 which act as a lens for one glass fiber each so that electrons emanating from the photocathode 53 are made to travel toward the spaces 54 shown in FIG. 4.

There has thus been shown and described a novel optoelectronic image sensor which fulfills all the objects and advantages sought therefor. Many changes, modifications, variations and other uses and applications of the subject invention will, however, become apparent to those skilled in the art after considering this specification and the accompanying drawings which disclose the preferred embodiments therefor. All such changes, modifications, variations and other uses and applications which do not depart from the spirit and scope of the invention are deemed to be covered by the invention, which is to be limited only by the claims which follow.

What is claimed is:

1. An optoelectronic image sensor for a color camera comprising:
   (a) an image intensifier which is configured as a proximity-focussed image intensifier diode and contains a photocathode;
   (b) an interline-type semiconductor sensor coupled to the image intensifier and having light-sensitive elements arranged in lines and columns and light-insensitive areas located between the light-sensitive elements of adjacent columns; and
   (c) a color stripe filter which is disposed in front of the photocathode such that one color strip of the color stripe filter is associated with one column of light-sensitive elements of the semiconductor sensor; wherein the color stripe filter is attached to a glass pane which has a smaller diameter than the proximity-focussed image intensifier, and wherein the glass pane is inserted into a support ring preferably also made of glass in such a way that the surfaces of both the glass pane and the support ring, which point into the interior of the proximity-focussed image intensifier, are located essentially on the same plane.

2. The optoelectronic image sensor in accordance with claim 1, which the input window of the image intensifier is a clear glass pane which, on the inside of the image intensifier, carries the stripe filter onto which the photocathode is mounted.

3. The optoelectronic image sensor in accordance with claim 1, wherein the support ring has an inlet opening which conically converges toward the inside and in that the glass pane is provided with a corresponding conical edge.

4. The optoelectronic image sensor in accordance with claim 1, wherein light-impermeable stripes are provided between the color stripes.

5. The optoelectronic image sensor in accordance with claim 1, wherein said image intensifier includes a luminescent screen and wherein one fiber glass body only is arranged between the luminescent screen and the semiconductor sensor.

6. The optoelectronic image sensor in accordance with claim 4, wherein the light-impermeable stripes are manufactured by means of vapor deposition with chromium.

* * * * *